United States Patent [19]

Lynde et al.

[11] Patent Number: 5,297,630
[45] Date of Patent: * Mar. 29, 1994

[54] DOWNHOLE MILLING TOOL

[75] Inventors: Gerald D. Lynde, Houston, Tex.; Harold H. Harvey, Jr., Bossier City, Calif.

[73] Assignee: Baker Hughes Incorporated, Houston, Tex.

[*] Notice: The portion of the term of this patent subsequent to Sep. 29, 2009 has been disclaimed.

[21] Appl. No.: 948,362

[22] Filed: Sep. 21, 1992

Related U.S. Application Data

[63] Continuation of Ser. No. 680,702, Apr. 4, 1991, Pat. No. 5,150,755, which is a continuation-in-part of Ser. No. 621,063, Dec. 3, 1990, Pat. No. 5,058,666, which is a continuation of Ser. No. 181,812, Apr. 15, 1988, Pat. No. 4,978,260, which is a continuation-in-part of Ser. No. 816,287, Jan. 6, 1986, Pat. No. 4,796,709.

[51] Int. Cl.$^5$ .............................................. E21B 10/26
[52] U.S. Cl. .................................. 166/297; 166/55.6; 407/2; 407/116; 408/144
[58] Field of Search .................. 166/55.2, 55.6, 55.7, 166/55.8; 175/197, 325, 374, 375; 408/144, 145, 70, 80, 81, 82, 111, 213, 223, 227; 407/2, 6, 32, 66, 100, 116, 118, 119; 144/205; 82/40; 76/108.2, 108.4

[56] References Cited

U.S. PATENT DOCUMENTS

| | | | |
|---|---|---|---|
| 2,846,193 | 8/1958 | Chadderdon | 255/73 |
| 2,922,627 | 1/1960 | Kammerer | 255/76 |
| 3,110,084 | 11/1963 | Kinzbach | 29/105 |
| 3,114,416 | 12/1963 | Kammerer | 166/55.7 |
| 3,331,439 | 7/1967 | Sanford | 166/55.8 |
| 4,710,074 | 12/1987 | Springer | 408/200 |
| 4,717,290 | 1/1988 | Reynolds et al. | 407/34 |
| 4,796,709 | 1/1989 | Lynde et al. | 166/55.6 |
| 4,938,291 | 7/1990 | Lynde et al. | 166/55.8 |
| 4,978,260 | 12/1990 | Lynde et al. | 166/55.6 |
| 5,058,666 | 10/1991 | Lynde et al. | 166/55.6 |

Primary Examiner—William P. Neuder
Attorney, Agent, or Firm—Nydegger & Associates

[57] ABSTRACT

A cutting tool (22) includes a plurality of pivoted blades (36) for swinging outwardly to an expanded radial position for first cutting the walls of multiple casing strings (10, 11), and then removing a predetermined length of the casing strings (10, 11) simultaneously in a cutting action. Pivoted blades (36) have cutting elements (66) of a similar size and shape positioned about upper, lower sides (62) of the blades (36) engage the upper annular cut ends of the casing strings (10, 11) in a cutting action without tripping or removal from the bore hole.

9 Claims, 3 Drawing Sheets

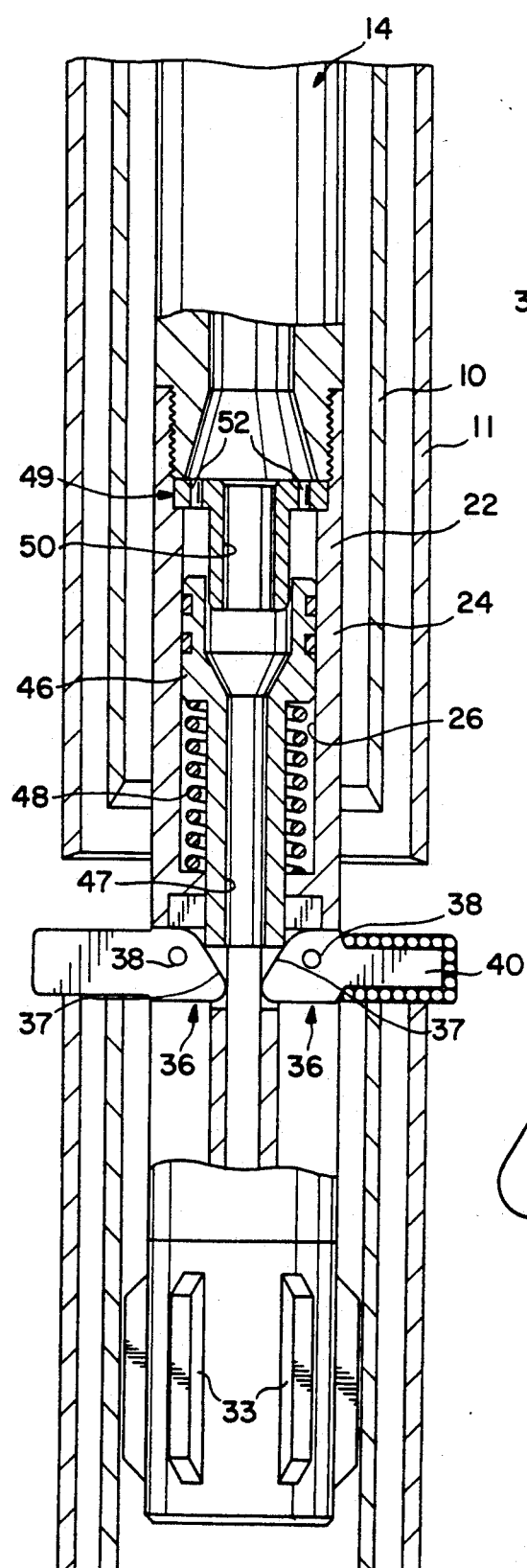
FIG. 4
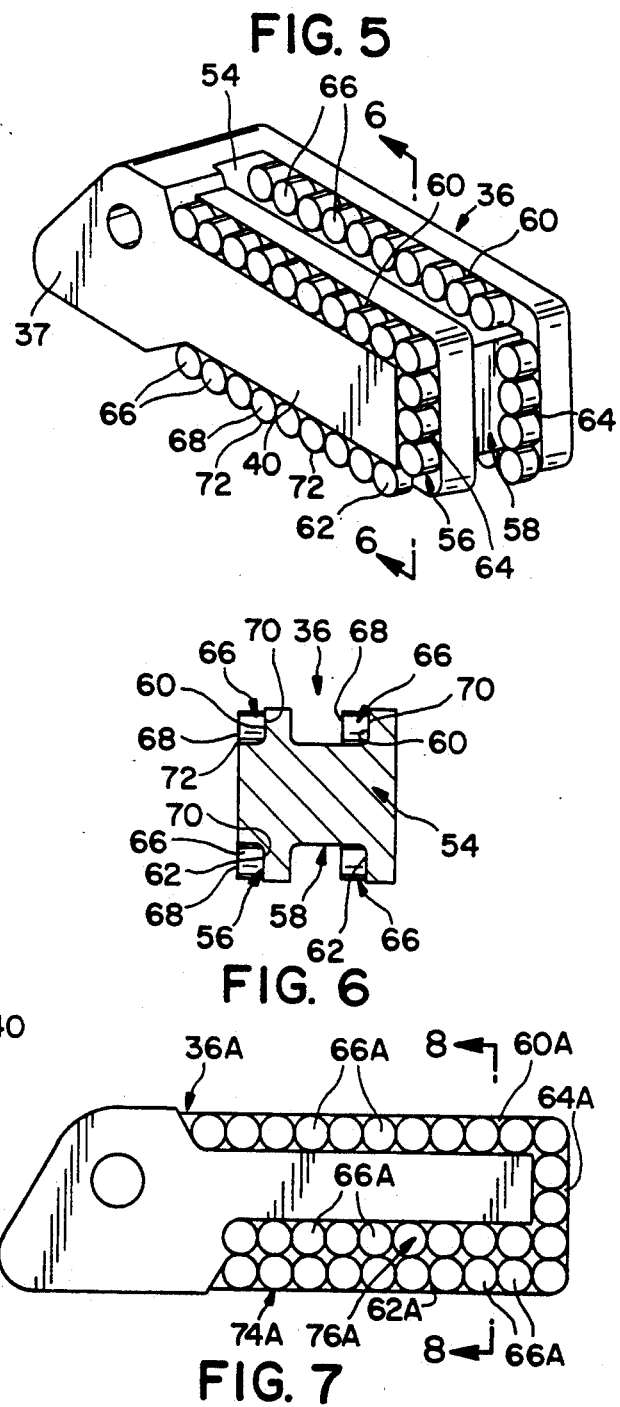
FIG. 5
FIG. 6
FIG. 7
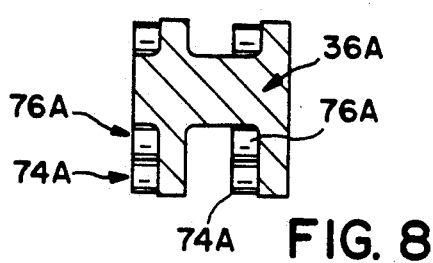
FIG. 8

DOWNHOLE MILLING TOOL

CROSS REFERENCE TO RELATED APPLICATIONS

This application is a continuation of copending application Ser. No. 680,702 filed Apr. 4, 1991 now U.S. Pat. No. 5,150,755 entitled "Milling Tool and Method for Milling Multiple Casing Strings" which is a continuation-in-part of application Ser. No. 621,063 filed Dec. 3, 1990 now U.S. Pat. No. 5,058,666 dated Oct. 22, 1991, which is a continuation of application Ser. No. 181,812, filed Apr. 15, 1988, now U.S. Pat. No. 4,978,260 dated Dec. 18, 1990, which is a continuation-in-part of application Ser. No. 816,287 filed Jan. 6, 1986, now U.S. Pat. No. 4,796,709 dated Jan. 10, 1989.

BACKGROUND OF INVENTION

This invention relates generally to a cutting or milling tool and method for cutting or milling fixed multiple casing strings downhole, and more particularly to such a cutting tool and method having cutting blades swinging radially outwardly from the cutting tool for cutting the casing strings.

Heretofore, such as shown in U.S. Pat. No. 4,887,668 dated Dec. 19, 1989, cutting tools for cutting well casing or casing strings have been provided utilizing swinging blades for first cutting the inner periphery of a string of well casing and then cutting a section of the cut casing string from its annular cut end for removing a desired length or longitudinal section of casing as might be required for removing a damaged section or to provide a window for diagonal drilling, for example. Swinging blades heretofore as shown in the aforementioned patent have had separate cutting inserts or discs mounted on their outer ends and upper sides for cutting a single string of casing.

Normally, and especially for wells of a substantial depth, casing strings of different diameters are utilized with the lowermost casing string being of the widest diameter. For example, an outer lower casing of around 13⅜ inches in diameter with an inner upper casing of around 9⅝ inches in diameter may be utilized with overlapping end portions providing an annulus filled with concrete for securing the two casing strings together in a sealed relation. Thus, in the event the removed casing sections include a so-called cemented joint, it is necessary to remove two separate casing strings at the joint as well as concrete in the annulus between the strings.

In the event the inner casing is removed first in one cutting operation, and then the outer casing is removed in a separate cutting operation a different blade or tool is utilized which requires a tripping or removal of the tool from the bore hole. If the same cutting tool is used for both cutting operations, it is difficult to stabilize the cutting tool during cutting of the outer string as the tool body which fits within the inner casing is spaced laterally a substantial distance from the inner periphery of the outer casing. While special blades utilizing a tang or projecting lug on the lower end of each blade for riding along the inner periphery of the outer casing may be used for stabilization of the tool during the cutting operation, such an arrangement requires removal of the cutting tool from the bore hole after cutting of the inner casing for attachment of the special blades and subsequent running in of the tool. Such a "tripping" of the cutting tool is costly and time consuming.

U.S. Pat. No. 3,331,439 shows a cutting tool for cutting multiple casing strings simultaneously without having to remove the cutting tool from the well bore and with the cutting tool centered by the small diameter casing being cut. However, this cutting tool removes a section or length of casing by engaging and cutting the lower annular cut end of the casing and the cutting surface of the blade is along its upper side only.

For cutting multiple casing strings simultaneously, the cutting blades must first cut through the walls of the multiple casing strings in series, and then a section or length of the multiple casing strings is cut away simultaneously. Thus, as shown in U.S. Pat. No. 3,331,439, the cutting surface on the extending end of the pivoted blade has been utilized for cutting through the casing walls in series and then the cutting surface along the upper side of the blade has been utilized for cutting away the lower annular cut ends of multiple casing strings simultaneously during upward movement of the cutting tool.

SUMMARY OF THE INVENTION

The present invention is directed to a cutting or milling tool and method for cutting or milling fixed multiple casing strings downhole, and particularly to such a cutting tool and method for cutting multiple casing strings simultaneously with the same swinging blades and without any trips in and out of the well being required for changing to different type blades or tools. The cutting tool has a plurality of radially swinging blades with closely spaced individual cutting elements of a generally similar shape and size along the end of the blades and along both the upper and lower sides of the blades when swung outwardly into a cutting relation. Upon rotation of the cutting tool and initiation of the cutting action from outward swinging of the blades, the cutting elements adjacent the corner of each blade between the end and upper side thereof first engage the inner periphery of the inner casing for cutting through the wall of the inner casing. After cutting through the wall of the inner casing, the blades expand further outwardly and the cutting elements on the lower sides of the blades then engage the upper annular cut end of the inner casing in cutting relation for removal of the inner casing. At the same time, the cutting elements adjacent the corners of the blades at the ends and top sides of the blades simultaneously engage the inner periphery of the outer casing for cutting through the wall of the outer casing. Upon cutting through the wall of the outer casing, the elongate blades further expand radially to a generally horizontal position with the cutting elements on the lower sides of the blades then engaging simultaneously in cutting relation the upper annular ends of both the inner casing and the outer casing for removal of a predetermined length thereof. The cutting tool is centralized or stabilized within the inner casing by stabilizer fins extending laterally outwardly from the tool body to a position adjacent the inner periphery of the inner casing for maintaining the cutting tool in a centered position during the cutting operation.

It is an object of this invention to provide a method utilizing swinging blades of a cutting tool for first cutting through the walls of inner and outer casing strings in a bore hole, and then removing simultaneously in a cutting action a predetermined length of the inner and outer casings without any removal of the cutting tool from the bore hole being required.

It is a further object of the invention to provide a cutting tool having swinging blades for first cutting through the walls of inner and outer casings, and then removing a predetermined length of the casings in a cutting action resulting from downward movement of the tool in the bore hole and without any removal of the cutting tool from the bore hole being required.

It is another object of this invention to provide a cutting tool having outwardly swinging blades with individual cutting elements mounted on the end and upper and lower sides of each blade when swung outwardly into cutting relation thereby to permit a simultaneous cutting action against multiple casings by the cutting elements on the lower sides of the blades.

Other objects, features and advantages of this invention will become more apparent after referring to the following specification and drawings.

BRIEF DESCRIPTION OF DRAWINGS

FIG. 4 is a longitudinal sectional view similar to FIGS. 2 and 3 but showing the blades in full expanded position engaging the upper annular cut ends of both inner and outer casings in cutting relation for removal of a predetermined length or section of the casings;

FIG. 5 is a perspective of a blade of the present invention removed from the cutting tool shown in FIGS. 2-4 and showing a plurality of individual cutting elements along the periphery of the blade;

FIG. 6 is a section taken generally along line 6—6 of FIG. 5;

FIG. 7 is a front elevation of another embodiment of a blade of this invention in which two rows of cutting elements are provided on the lower side of the blade;

FIG. 8 is a section taken along line 9—9 of FIG. 8;

DESCRIPTION OF THE INVENTION

Figure 1A:
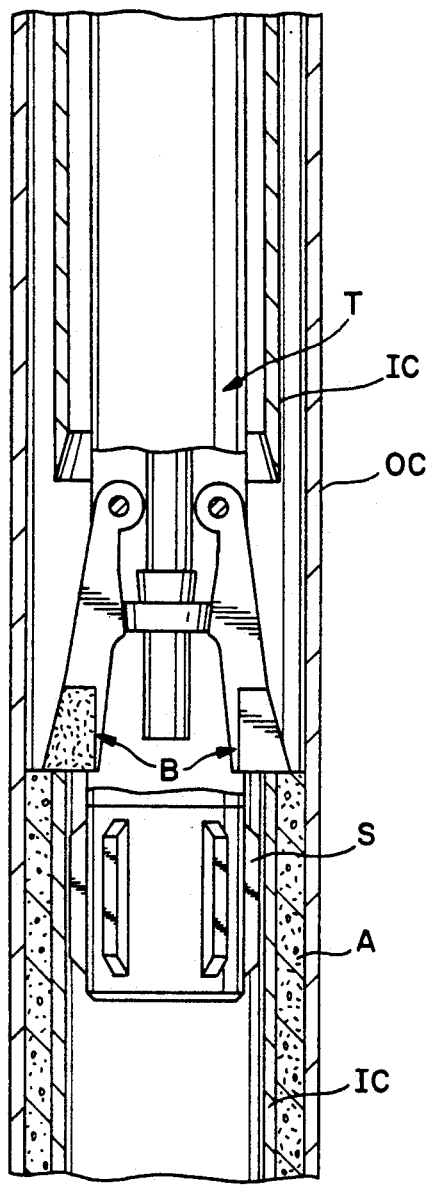
FIGS. 1A and 1B are examples of prior art cutting tools for cutting a well joint having inner and outer concentric casings in which a separate cutting operation is provided for each casing string upon a downward movement of the cutting tool.
Figure 1B:
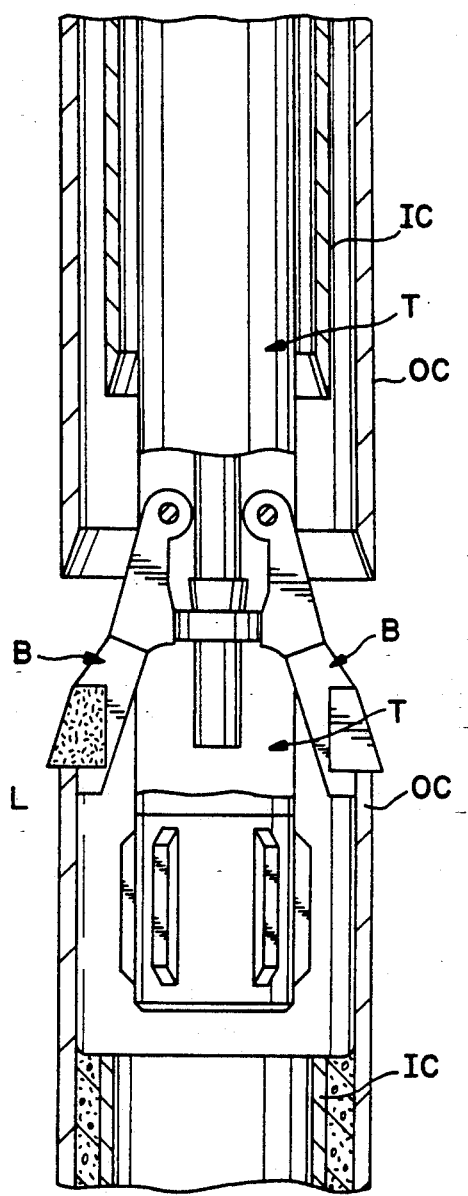

Referring first to FIGS. 1A and 1B, examples of prior art cutting tools for cutting concentric casing strings upon downward movement are illustrated. FIG. 1A shows cutting tool T with blades B cutting an inner casing IC and a stabilizer S for centering tool T within inner casing IC during the cutting operation. An annulus A between inner casing IC and outer casing OC is normally filled with concrete. FIG. 1B shows blades B in cutting relation with outer casing OC in a separate cutting operation after removal of a section of inner casing IC. A tang or lug L on blades B is provided to ride along outer casing OC to center or stabilize tool T within outer casing OC.

Figure 2:
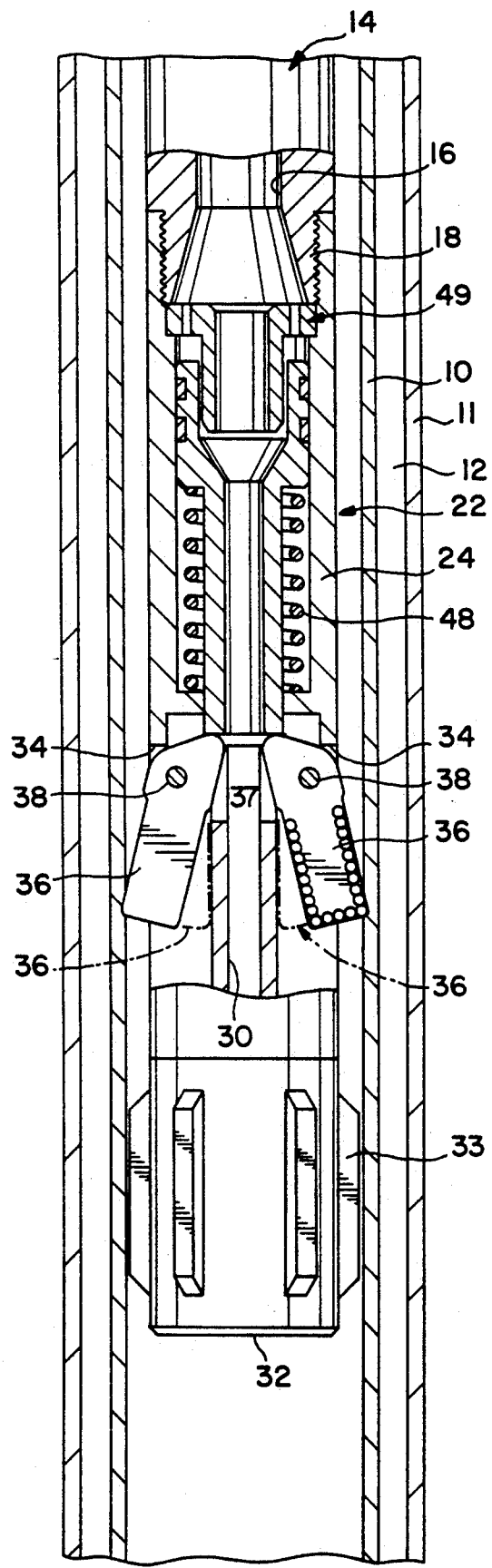
FIG. 2 is a longitudinal sectional view, partly in elevation, showing a cutting tool comprising the present invention positioned within an inner casing surrounded by an outer concentric casing with the cutting blades engaging the inner periphery of the inner casing.
Figure 3:
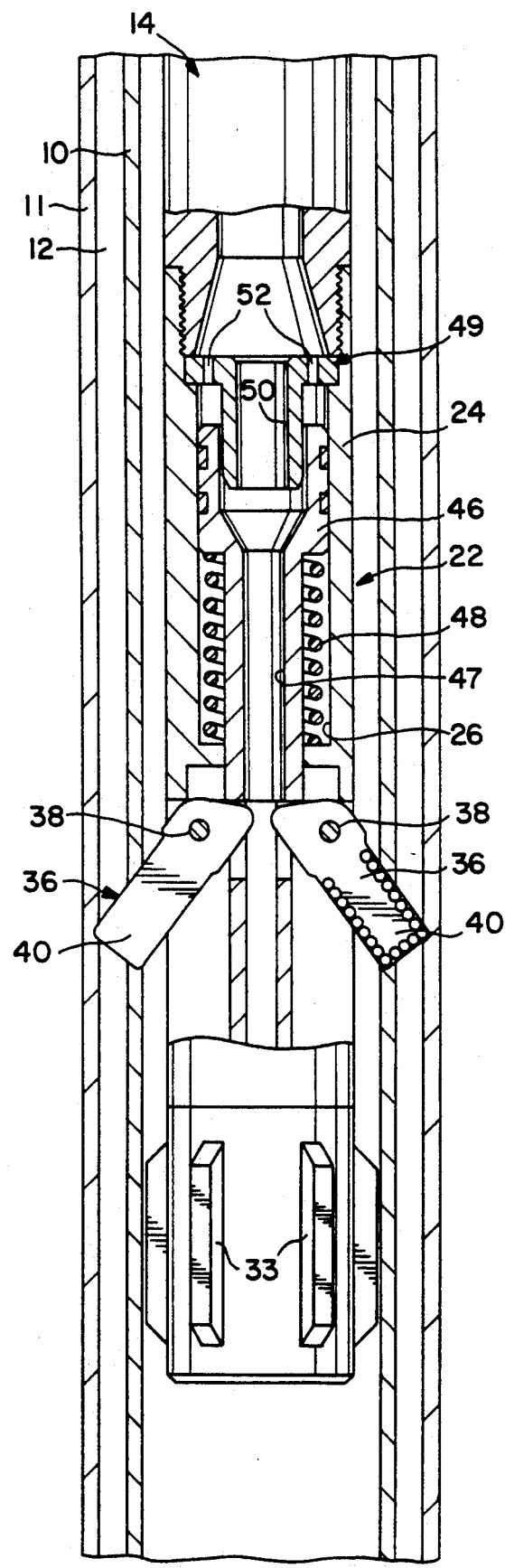
FIG. 3 is a longitudinal sectional view similar to FIG. 2 but showing the ends of the blades engaging the inner periphery of the outer casing with the lower sides of the blades simultaneously engaging the inner casing in a cutting action.

Referring now to the drawings for a better understanding of this invention, and more particularly to FIGS. 2-4, an inner casing or casing string for a well is shown at 10 and an outer concentric casing or casing string is shown at 11. The annulus 12 between casings 10, 11 is usually filled with concrete (not shown). A drill string is indicated generally at 14 having a central bore 16 to receive drilling fluid through drill string 14 from a surface location. A lower threaded end 18 of drill string 14 is received in threaded engagement within the upper end of a cutting tool generally indicated at 22.

Cutting tool 22 has a tubular cutter body 24 forming a central bore 26 in which fluid pressure responsive means indicated generally at 28 is housed and is responsive to flowing drilling fluid from drill string 14 for hydraulic actuation as will be explained further. Cutting tool 22 has a lower reduced diameter bore portion 30 with a lower end 32 for the discharge of drilling fluid. Stabilizer fins 33 extending from body 24 engage the inner periphery of inner casing string 10 for centering tool 22. Longitudinally extending slots 34 are circumferentially spaced about the periphery of tubular cutter body 24 adjacent reduced diameter bore portion 30 and receive elongate cutter blades 36 of a generally rectangular configuration. Each elongate cutter blade 36 has an upper end portion 37 pivotally mounted by a pin 38 to cutter body 24 and a lower downward extending end portion 40. Blades 36 are free for pivoting between a retracted position shown in broken lines in FIG. 2 for lowering within casing 10 and a radially expanded or extended position as shown in FIGS. 3 and 4 in which lower end portions 40 of blades 36 are swung or moved radially outwardly first into cutting contact with the inner periphery of inner casing 10 as shown in FIG. 2 for cutting through the wall of inner casing 10, and then further extended or expanded radially into cutting contact with the inner periphery of outer casing 11 as shown in FIG. 3 for cutting through the wall of outer casing 11. Cutting tool 22 of the present invention is particularly adapted for cutting through both inner casing 10 and outer casing 11 and then removing a predetermined length of casings 10, 11 in a simultaneous downward cutting action. The cutting operation is normally accomplished in a single trip within the well by directing drilling fluid under pressure from the surface through casing string 10 and by rotating casing string 10 and cutting tool 22 with blades 36 pivoted into a radially expanded position into cutting contact with the periphery of the casing to be cut. The pivotal connections 38 between blades 36 and cutter body 24 are designed so that the connections are sufficient to transmit the torque required to accomplish the cutting of casing strings 10, 11.

For moving lower end portions 40 of cutter blades 36 radially outwardly into expanded cutting engagement with the adjacent casing, fluid pressure responsive means generally indicated at 28 includes a piston 46 having a reduced diameter bore 47 and mounted within cutter body 24. Spring 48 urges piston 46 upwardly. A flow restriction 49 has a reduced diameter bore 50 and a plurality of spaced ports or orifices 52. When a predetermined fluid pressure differential is reached, piston 46 moves downwardly contacting end portions 37 to pivot cutter arms 36 radially outwardly into cutting engagement with casings 10 and 11. When cutter arms 36 are pivoted outwardly into contact with casing 10 or 11, a decreased fluid pressure differential is indicated at the surface so that an operator is aware that cutter arms 36 are in expanded cutting engagement with the inner periphery of the casing to be cut.

Each blade as shown particularly in FIGS. 5 and 6 has a main body portion 54 with cutaway sections defining a leading recessed portion 56 and a trailing recessed portion 58 with respect to the direction of rotation. Each recessed portion 56, 58 extends continuously along three sides of blade 36 to define relative to the fully expanded cutting position of blade 36 an upper side 60, a lower side 62, and an outer extending side or end 64 extending between and connecting upper and lower sides 60, 62.

Sides 60, 62 and connecting end 64 form a planar mounting surface for a plurality of cutting elements or inserts indicated at 66. A single row of cutting elements 66 is mounted on sides 60, 62 and a single row or column of cutting elements 66 is mounted on extending end 64. Cutting elements 66 are preferably formed of tungsten carbide and have leading cutting faces 68 and opposed parallel rear faces 70. Rear planar faces 70 may be secured by suitable brazing or the like to the planar mounting surfaces defining sides 60, 62, and 64. The outer periphery of cutting face 68 defines a cutting edge 72. A cutting element 66 which has been found to function in a satisfactory manner is a generally cylindrical tungsten carbide disc having a thickness of three-sixteenths (3/16) inch, a diameter of three-eights (3/8) inch, and sold under the name "Sandvik S6" by the Sandvik Company, located in Houston, Tex.

The embodiment shown in FIGS. 1-6 includes only a single row of cutting elements 66 on the leading and trailing lower sides 62 of blade 36. Since the lower sides 62 of blade 36 are utilized exclusively during the cutting operation for removing a section of casing after the wall of the casing has been cut, the cutting elements on the lower side of the blade are subject to more wear and a longer cutting operation. For that reason it may be desirable to provide more than one row of cutting elements on the lower side of the blade.

The blade embodiment shown in FIGS. 7 and 8 has two rows of cutting elements shown generally at 74A and 76A on blade 36A. Cutting elements 66A are mounted on three sides 60A, 62A, and 64A of blade 36A as in the embodiment of FIGS. 1-6. Cutting elements 66A in lower rows 74A and 76A of blade 36A are axially aligned and follow the same cutting path in the fully extended cutting position of FIG. 4.

Figure 9:
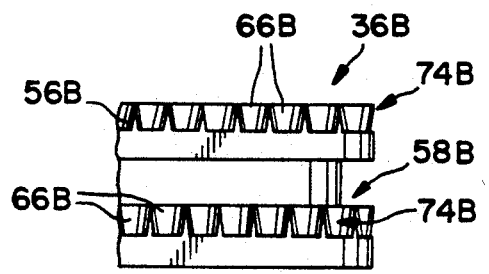
FIG. 9 is a bottom plan of an extending end portion of a modified blade in which the cutting elements on the leading and trailing rows are staggered horizontally to provide different concentric cutting paths.

It may be desirable for the cutting elements in the lower leading and trailing rows to be staggered horizontally when in the cutting position of FIG. 4 so that different concentric cutting paths along the upper annular ends of the casing strings are provided by the corresponding trailing and leading rows. For that purpose, a further blade embodiment is shown in FIG. 9 in a partial bottom plan view of blade 36B. Blade 36B has a lower leading row 74B of cutting elements 66B in recessed portion 56B and a lower trailing row 74B of cutting elements 66B in recessed portion 58B. Cutting elements 66B in trailing row 74B are staggered horizontally with respect to cutting elements 66B in leading row 74B in the full extended cutting position and thus follow different concentric cutting paths. In some instances, it may be desirable to stagger the cutting elements on adjacent blades so that different concentric cutting paths are provided by the corresponding cutting elements on adjacent blades.

Figure 10:
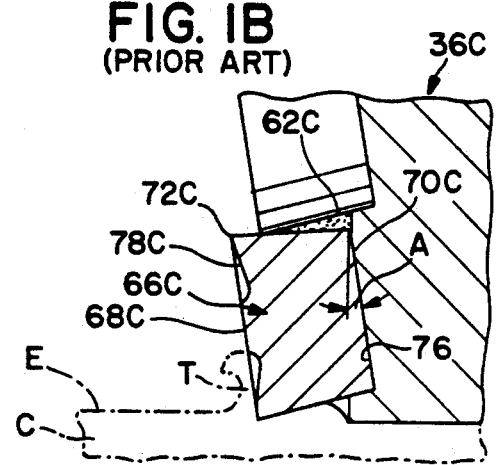
FIG. 10 is a partial sectional view of a further modified blade in which the cutting elements have a negative axial rake and the front face of a cutting element is shown engaging the upper annular end of a casing in cutting relation.

The cutting elements 66 shown in the embodiment of FIGS. 1-6 have leading cutting faces 68 forming a planar cutting surface extending in a generally vertical plane parallel to the longitudinal axis of rotation. It may be desirable under certain conditions to have the front face and peripheral cutting edge of each cutting elements arranged and constructed in such a manner as to effect a "chip breaker" action to provide a metal turning or shaving from the upper annular end of the casing in a predetermined size range in order to minimize any internesting of metal turnings cut from the casing. For that purpose, a modified blade 36C is shown partially in the embodiment of FIG. 10 having a leading mounting surface or side at 62C. For the purpose of illustration, only one cutting element 66C is illustrated as it is understood that the remaining cutting elements are similar to cutting element 66C. A recess 76 is provided in leading surface or face 62C of blade 36C to form a mounting surface for rear face 70C of cutting elements 66C inclined at a negative rake angle A of around fifteen degrees for example. Since cutting face 68C is parallel to rear mounting face 70C, cutting face 68C is likewise provided with the negative rake angle of around fifteen degrees. A negative rake angle of between around two degrees and twenty-five degrees would provide a so-called "chip breaker" effect. The upper annular end E of a casing C is shown in FIG. 10 and a metal turning T is shown being cut from end E by cutting element 66C. Front face 68C has an annular groove or deformation 78C therein adjacent cutting edge 72C and receives metal turning T for bending turning T in an outward and downward direction to effect a breaking of turning T. Thus, the length of turning T is minimized by the negative axial rake angle A and deformation 78C in the front cutting face 68C of cutting element 66C.

When the cutting operation is commenced with an unused or new carbide disc, sharp edge 72C initially contacts the inner periphery of the casing to be cut. It is desirable to obtain a relatively short metal turning T which does not tend to intertwine with other metal turnings or shavings and provide an internesting mass which might restrict the removal of such metal scrap. The inclination of cutting face 68C in contact with the metal turnings T, particularly if formed with a deformation 78C therein, assists in the breaking of metal turnings T at a relatively short length of between one to four inches, for example, and since a substantial thickness of turnings T is provided, the curling or turning up of the ends of the turnings T is restricted.

While inner and outer casings 10 and 11 are shown in the drawings as being in an exact concentric relation, it is to be understood that the present invention will function in a satisfactory manner with the inner and outer casings in an eccentric relation.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. In a cutting tool adapted to be positioned downhole in a well for removing material from the well bore;

a tool body adapted to be received within said well and to be supported at its upper end for rotation about a longitudinal axis;

a plurality of cutting surfaces at spaced intervals around the tool body;

each of said cutting surfaces comprising a plurality of cutting elements arranged in at least one column extending generally along the longitudinal direction of the tool body for presenting at least part of said cutting surface;

each cutting element being of a predetermined size and shape and arranged in a predetermined columnar pattern; and with each of said cutting elements having an exposed cutting face including a surface irregularity for directing an extending end portion of a turning cut from said material to effect a breaking of said turning from the material being cut in a predetermined manner to minimize internestings of the turnings.

2. In a cutting tool as set forth in claim 1 wherein said surface irregularity in the front face of each cutting element comprises a recess in the surface of the cutting element to receive an end of the turning and redirect it away from the cutting face of said cutting element.

3. In a cutting tool adapted to be positioned downhole in a well for removing material from the well bore;

a tool body adapted to be received within said well and to be supported at its upper end for rotation about a longitudinal axis;

a plurality of cutting surfaces at spaced intervals around the tool body;

each of said cutting surfaces comprising a plurality of cutting elements arranged in at least one row extending generally transversely relative to the axis of rotation of the tool for presenting at least part of said cutting surface;

each cutting element being of a predetermined size and shape and arranged in a predetermined pattern with each cutting element being in generally side-by-side relationship to the cutting elements adjacent to it; and with each of said cutting elements having an exposed cutting face for including a surface irregularity for directing an extending end portion of a turning cut from said material to effect a breaking of said turning from the material being cut in a predetermined manner to minimize internestings of the turnings.

4. In a cutting tool as set forth in claim 3 wherein said surface irregularity in the front face of each cutting element comprises a recess in the surface of the cutting element to receive an end of the turning and redirect it away from the cutting face of said cutting element.

5. In a cutting tool adapted to be positioned downhole in a well for removing material from the well bore:

a tool body adapted to be received within said well and to be supported at its upper end for rotation about its longitudinal axis;

a plurality of cutting surfaces at spaced intervals around the tool body;

each of said cutting surfaces comprising a plurality of cutting elements for presenting at least part of said cutting surface;

each cutting element being of a predetermined size and shape and arranged in a predetermined uniform pattern;

with each of said cutting elements having an exposed cutting face presenting a surface irregularity for deflecting a turning, cut from said material, outwardly from said cutting face and back toward said material, causing said turning to break into relatively short lengths.

6. A cutting tool as claimed in claim 5, wherein said surface irregularity comprises a projection on said cutting face of said cutting element.

7. A cutting tool as claimed in claim 5, wherein said surface irregularity comprises a depression in said cutting face of said cutting element.

8. A cutting tool as claimed in claim 5, wherein said uniform pattern comprises at least one column of said cutting elements extending substantially parallel to said longitudinal axis.

9. A cutting tool as claimed in claim 5, wherein said uniform pattern comprises at least one row of said cutting elements extending substantially transversely to said longitudinal axis.

* * * * *